United States Patent
Benali et al.

(10) Patent No.: US 9,415,515 B2
(45) Date of Patent: Aug. 16, 2016

(54) METHOD AND APPARATUS FOR FIXING A MANIPULATOR AXIS

(71) Applicant: KUKA Laboratories GmbH, Augsburg (DE)

(72) Inventors: Zoubir Benali, Augsburg (DE); Andreas Hagenauer, Friedberg (DE); Stefan Poth, Diedorf (DE)

(73) Assignee: KUKA Roboter GmbH, Augsburg (DE)

( * ) Notice: Subject to any disclaimer, the term of this patent is extended or adjusted under 35 U.S.C. 154(b) by 0 days.

(21) Appl. No.: 14/619,551

(22) Filed: Feb. 11, 2015

(65) Prior Publication Data

US 2015/0224646 A1   Aug. 13, 2015

(30) Foreign Application Priority Data

Feb. 12, 2014  (DE) .......................... 10 2014 001 923

(51) Int. Cl.
| | |
|---|---|
| *G05B 9/00* | (2006.01) |
| *B25J 9/16* | (2006.01) |
| *G05B 19/406* | (2006.01) |
| *G01L 5/28* | (2006.01) |

(52) U.S. Cl.
CPC .............. *B25J 9/1674* (2013.01); *G01L 5/288* (2013.01); *G05B 19/406* (2013.01); *G05B 2219/39196* (2013.01); *G05B 2219/40218* (2013.01)

(58) Field of Classification Search
CPC ...... B25J 9/1674; B25J 19/0004; B25J 19/06; G05B 19/406; G05B 2219/14039; G05B 2219/40218; G05B 2219/41279; Y10S 901/02

USPC .......... 700/245, 259, 261; 318/273, 372, 375; 901/2, 23, 38; 702/34, 183
See application file for complete search history.

(56) References Cited

U.S. PATENT DOCUMENTS

| | | | |
|---|---|---|---|
| 2007/0187367 A1* | 8/2007 | Kita ...................... | B23H 7/26 219/69.11 |
| 2009/0187277 A1* | 7/2009 | Bird-Radolovic ..... | B25J 9/1674 700/245 |
| 2011/0245970 A1* | 10/2011 | Wells ................... | B25J 19/0004 700/245 |
| 2012/0060597 A1 | 3/2012 | Lee et al. | |
| 2013/0154522 A1 | 6/2013 | Verheyen et al. | |
| 2013/0218332 A1* | 8/2013 | Hofmann ............... | B25J 9/1651 700/245 |
| 2014/0000355 A1* | 1/2014 | Shikagawa ............ | G01M 13/00 73/118.01 |

FOREIGN PATENT DOCUMENTS

| | | |
|---|---|---|
| CN | 1833929 A | 9/2006 |
| CN | 103252780 A | 8/2013 |

(Continued)

OTHER PUBLICATIONS

German Patent Office; Search Report in German Patent Application No. 10 2014 001 923.3 dated Nov. 18, 2014; 10 pages.

(Continued)

*Primary Examiner* — Dalena Tran
(74) *Attorney, Agent, or Firm* — Wood, Herron & Evans, LLP

(57) ABSTRACT

A method for fixing the position at least one axis of a manipulator, in particular of a robot, includes closuring a mechanical brake of the axis, deactivating an actuator of the axis with a motion controller, monitoring the mechanical brake, and activating the actuator with the motion controller if a monitoring system identifies a fault condition of the mechanical brake.

17 Claims, 3 Drawing Sheets

(56) References Cited

FOREIGN PATENT DOCUMENTS

| | | |
|---|---|---|
| CN | 103507082 A | 1/2014 |
| DE | 10062228 A1 | 6/2002 |
| DE | 102005037189 A1 | 2/2007 |
| DE | 102008015948 A1 | 10/2009 |
| DE | 102008015949 A1 | 10/2009 |
| DE | 102012003479 A1 | 8/2013 |
| DE | 102013010406 A1 | 1/2014 |
| EP | 1215475 A2 | 6/2002 |
| EP | 1239354 A1 | 9/2002 |
| EP | 1806837 A1 | 7/2007 |
| EP | 1857229 A1 | 11/2007 |
| EP | 2108933 A2 | 10/2009 |
| EP | 2631043 A2 | 8/2013 |
| JP | H0276691 A | 3/1990 |
| JP | H09254079 A | 9/1997 |

OTHER PUBLICATIONS

European Patent Office; Search Report in European Patent Application No. 15000104.8 dated Nov. 16, 2015; 7 pages.

Chinese Patent Office; Office Action in Chinese Patent Application No. 201510073347.3 dated Dec. 31, 2015; 17 pages.

\* cited by examiner

METHOD AND APPARATUS FOR FIXING A MANIPULATOR AXIS

TECHNICAL FIELD

The present invention relates to a method and a device for fixing the position at least one axis of a manipulator.

BACKGROUND

Although stopping brakes in robots are generally extremely reliable, the risk of failure should be reduced further, particularly for safety critical situations.

However, the problem arises, when using actuators with only one brake, of realizing the maximum acceptable residual risk of an unwanted movement by a single-channel system.

Carrying out a periodical brake test in order to record creeping changes in brake performance is therefore known in accordance with in-house practice. If preset performance criteria are not met, the respective brake is replaced. This method is, however, not appropriate for situations where braking performance decreases spontaneously.

Another method known from in-house practice therefore consists in not closing the brake or not using it at all, in particular in safety critical situations. The axis is actively brought to a standstill instead by means of a correspondingly controlled actuator torque thereby falling under stop category 2 according to DIN EN 60204-1:2007-06, which defines three categories of a stop function for manipulators:

Stop 0: uncontrolled stopping through immediate interruption of the power supply to the machine actuators;

Stop 1: controlled stopping where the power supply to the machine actuators is still available in order to achieve the stop. The power supply is removed when the stop is achieved or the reliable period for stopping has been exceeded; and Stop 2: controlled stopping where the power supply to the machine actuators is left available.

In terms of control technology, these three categories can be implemented in different ways.

If the axis is actively brought to a standstill by a closed brake by means of a correspondingly controlled actuator torque, this results in the disadvantage of keeping the manipulator in an active state, which requires power, and can also result in noise pollution.

SUMMARY

One object of an embodiment of the present invention is to improve the operation of a manipulator.

An inventive method to fix the position one or more, in particular all axes of a manipulator, in particular of a robot, comprises a plurality of steps explained below. Two or more of the steps can be performed sequentially and/or in parallel. The method is described below using the example of an individual axis of an individual manipulator, without being restricted thereto. The method can also be used to fix several axes of one or more manipulators.

In one step a brake, in particular a stopping brake, of the axis is closed. A brake of this type can be, in particular, a mechanical, hydraulic and/or pneumatic brake; in particular have a spring-loaded brake. In one embodiment, the brake can be actuated electrically and/or magnetically, in particular is an actuated brake. In one embodiment, the brake is a normal brake or a brake closed without power, which needs to be actively ventilated and is therefore also referred to as a safety brake.

In one embodiment, the axis of the manipulator is actively brought to a standstill, in particular in advance, in particular as the actuator thereof exerts corresponding braking torques on the axis.

In a further step, in particular after the brake has been closed, actuation of an axis actuator is deactivated by a motion controller.

In one embodiment, the motion controller can be, in particular, a position controller, a speed controller, a torque or force controller, and/or have an admittance or impedance controller. For the purpose of providing a more concise description, the term "force" will also generally describe a torsional force, i.e. an anti-parallel pair of forces. The motion controller can be cascaded in one or more hierarchies, in particular with an external cascade, which comprises a position controller, for example, and an internal cascade, which comprises a current controller, for example.

In a further step, the function of the closed brake will continue to be monitored, in particular by the motion controller. This step can take place, in particular, parallel to the other steps of the inventive method, in particular constantly, and/or during operation of the manipulator, in particular when power is supplied to its controller. Monitoring can take place in various ways, some of which are described in more detail later in the description.

If the monitoring system identifies a fault condition of the brake, the deactivated actuation of the actuator will be reactivated. As a result, the axis can be fixed again, in particular or exclusively, by the actuator and no longer solely or no longer also by the brake.

In this manner, in one embodiment, the disadvantages of active fixing of the axis can be reduced by a correspondingly controlled force of the actuator thereof, in particular respective power consumption and/or a resulting noise emission. Additionally, or alternatively, a spontaneous failure of the brake can also be controlled in a safety-relevant manner by reactivating the actuation of the axis using the motion controller, wherein, in an advantageous embodiment, further motion control that occurs or is implemented can intervene particularly quickly even if the brake is closed, and thus can effect or ensure fixing the position of the axis. Activation of an axis actuator by a motion controller is understood accordingly, in particular, as the transfer of instructions and/or power by the motion controller to the actuator or the following or implementation of said instructions by the actuator and deactivation of an axis actuator by a motion controller is understood accordingly as the interruption of such transfer or following of instructions and/or power. In other words, in one embodiment, the motion controller continues to work when the brake is closed, in particular, the motion controller can be supplied with power and/or sensor signals, wherein only the actuation of the actuator by these deactivates further motion control, in particular a transfer of instructions and/or power by the motion controller to the actuator is interrupted. This can be illustrated using the example of a vehicle clutch, in which the actuation of the drive wheels is deactivated by the (still working) engine by releasing the clutch and activated again by closing it.

An actuator in accordance with the present invention can comprise, in particular, one or more electric motors. An electric motor can be set up in particular to convert electrical energy into mechanical energy. An electric motor is operated preferably using a direct and/or an alternating current, wherein the alternating current can have, in particular, a specific frequency and/or a specific amplitude. An electric motor is configured preferably as a brushless direct current motor, synchronous machine or asynchronous machine. In particular, a motor can have an electronic commutation. Preferably, the motor has a converter and/or a booster, in particular a pulse-width modulation ("PWM") booster.

A brake in accordance with the present invention is used preferably to apply a stopping torque or a part of a stopping force for braking or fixing the position a manipulator axis. As explained above, a torsional force is generally referred to, in particular, also as force in this document. Fixing is understood in the present document, in particular, as a stopping of a motionless axis.

Actuation in accordance with the present invention can include, in particular, one or more actuators of a manipulator axis. Additionally, or alternatively, actuation may comprise one or more closed loops, which are cascaded hierarchically in one embodiment, operate in parallel and/or are activated depending on their condition. Here, condition can be a condition of the inventive method, a condition of the manipulator and/or a condition from an environment of the manipulator, in particular of a device and/or a method.

Various steps can take place in response to the identification of a fault condition of the brake. Inventively, there is a re(activation) of the actuator of the respective manipulator by the motion controller. Thus, active fixing of the manipulator axis by the actuator is possible.

Monitoring in accordance with the present invention is, in particular, specific observation, in particular of the brake, and collection of information, in particular about the function of the brake. Monitoring can include, in particular, the recording and evaluation of conditions of the brake and/or the actuator, actuation, the axis and/or the manipulator. Monitoring serves, in particular, to increase the safety of people and machines. Preferably, monitoring serves to increase the safety of people and manipulator assembly devices. Additionally, or alternatively, monitoring can also serve to increase the safety of people and devices, who or which interact with the manipulator assembly and/or are present in the hazard area of the manipulator assembly. Monitoring preferably includes a comparison of actual and target values. Monitoring can relate to limit values that must be complied with, in particular position-dependent limit values (for example, working area, displacement of a manipulator, speed, acceleration, jerking etc.) and/or force and/or torque-dependent limit values as well a combination of said values. Additionally or alternatively, a parameter of a model, in particular an estimated model, can be monitored, wherein the model is estimated preferably on the basis of information that has been collected. In one embodiment, monitoring takes place continuously, discretely, periodically and/or at irregular intervals, in particular is event-controlled. Preferably, the manipulator, in particular one or more axes of the manipulator, is conveyed in a safe condition if monitoring registers erroneous function. A safer condition can be achieved by means of an emergency stop and/or soft switching, in particular of specific manipulator axes.

In one embodiment of the inventive method, the actuator is supplied with power whilst the mechanical brake is closed. Power can be supplied permanently in particular, and consequently a power supply to the actuator remains active even after the actuator has been deactivated. This can be achieved, in particular, by not disconnecting the power electronics, which supply the actuator with power, from an external energy supply, or by keeping the connection to an external power supply and supplying power even if the brake is closed.

In one embodiment, a power supply in accordance with the present invention supplies one or more, in particular all, of the manipulator actuators with electrical power. The power supply can be fed from one, in particular public, power grid and/or an independent power grid. Additionally, or alternatively, a power supply can be fed from at least one battery assembly and/or an alternative energy storage device. Preferably, several actuators, in particular all actuators, of the manipulator are connected to the same power supply. Preferably, the power supply includes an intermediate circuit by means of which one or more actuators are supplied with power. In particular, one or more brakes of the manipulator can also be supplied with power by means of the intermediate circuit. Preferably, the power supply is connected to a controller. The power supply is set up in one embodiment to reduce and/or increase the power feed to one or more actuators, in particular to one or more motors and/or to one or more brakes of said actuators. Preferably, the power supply provides sufficient power to operate one or more actuators and/or brakes. Furthermore, preferably all other peripheral devices, such as grippers, controller, safety controller etc. can also be supplied with power by means of the same power supply.

According to one embodiment of the inventive method, a measurement based on a position of the axis and/or a chronological derivation of the position of the axis is monitored, in particular to identify a fault condition of the brake. Such a measurement in accordance with the invention can relate in particular to information about a device and/or a process. Preferably, such a measurement relates to information about the brake and/or a function of the brake. The position of the axis, which was duly adopted after the axis was fixed, can be monitored for example. A fault condition of the brake can be concluded in the event of a change in this position while the axis brake is closed and intended to ensure a standstill. Said fault condition would result inventively in the reactivation of the actuator in order to reduce, in particular to prevent, a further change of position, in the worst case scenario, a sinking downwards of the entire axis, and/or to return the axis to a safe condition. In addition to position, additionally or alternatively, position-based measurements can also be monitored, in particular the speed of an axis and/or the acceleration of an axis. It is also possible, instead of, or as well as monitoring the axis, to monitor the motion of the manipulator in its entirety, for example its Cartesian motion or its motion in the work areas, and preferably to conclude on the basis of this whether the brake is functioning properly or there is a fault condition.

According to one embodiment of the inventive method, one measurement, in particular to identify a fault condition of the brake, is monitored based on a current and/or voltage of the axis actuator. For example, the actuator can be monitored in terms of a current, which is induced in the actuator by a movement of the actuator, i.e. by a movement of the axis. Accordingly, in the event that such an induction current is identified, a movement of the actuator or the axis of the manipulator can be concluded and thus a fault condition of the brake, which in turn triggers the activation of the actuator. Such a measurement can also be defined on the basis of the actuator voltage. Additionally and/or alternatively, a measurement in accordance with the invention can be a function of a current and of a voltage. In particular, such a measurement can also be defined as a function, which includes other measurements relevant to brake function, for example position-based measurements.

In one embodiment of the inventive method, a measurement, in particular for identifying a brake malfunction, is monitored based on a force of the axis actuator. As explained above, such a force also constitutes a torque. The force can be recorded by means of an appropriate force sensor, which is present on the axis or is arranged on the manipulator such that it can record mechanical influences on the axis accordingly. A force exerted by the axis on the sensor during standstill can be measured, for example, after the axis has been fixed. In the event of a brake malfunction, which results in a movement of the axis or the manipulator, said force measured whilst the manipulator was at a standstill will change. A brake malfunction can be inferred accordingly based on such a change in force and the actuation of an actuator activated respectively in order to return the manipulator to a safe condition.

In one embodiment of the inventive method, the brake is assessed while it is closed. Such assessment can take place, in particular with the aid of one of more sensors, which collect information about the functional capability of the brake. A pressure sensor, for example, can collect information about the contact pressure of the brake. Additionally, or alternatively, another measurement, in particular an electrical measurement, relating to the brake, can also be taken by means of a sensor in order to assess the function of the brake. Additionally, or alternatively, the number of braking incidences can be measured by means of a counter and the brake assessed using this information. Additionally, or alternatively, the duration of braking activity can be measured using a timer and this can be used in turn to obtain various measurements, such as the total duration of brake activation and/or the average duration of brake activation. Additionally, or alternatively, braking incidence time can be measured using a timer in order to obtain information for assessing the brake. Preferably, a stopping force and/or braking force of the brakes can be recorded in a specific position of the axis, which is required in order to fix the axis and by means of which the brakes are assessed. In one embodiment, a specific position of the axis can be defined at the places where the force of gravity is greatest.

According to one embodiment of the inventive method, a force is generated by the actuator while the brake is closed. This means that the brake function can be tested and the brakes assessed in terms of their performance. An active brake test of this type can be performed in particular by continually increasing the force. This continuous increase can be linear or on a diminishing scale and consequently the increase in force on the brakes reduces continuously. Additionally, or alternatively, the force can be increased gradually, wherein a predefined increase in force is achieved at each stage. Preferably, a force is increased up to a predefined maximum force. Additionally, or alternatively, the force is increased by the actuator as long as the manipulator executes a breakaway movement. The breakaway movement while the brake is closed shows the maximum force the brake can withstand in its current condition. The gravitational torque affecting the brake can also be included in order to obtain an estimation that is as accurate as possible of the currently potential maximum force of the brake.

In one embodiment, the force measured or determined, which represents a braking function of the brake, is communicated to a manipulator controller and/or to a device external to the manipulator (controller). This enables the brake to be assessed locally in the manipulator controller and/or in a central data processing system that is connected to the manipulator. Thus, advantageously, brake maintenance, in particular changing the brake for example, can be signaled and/or displayed by the controller.

According to one embodiment, a signal is sent to the manipulator controller and/or a device external to the manipulator (controller) if a fault condition of the brake is identified. Thus, in particular a higher-level safety system, which the manipulator and a manipulator cell, for example, in which the manipulator moves, can be controlled accordingly and appropriate safety functions triggered if a fault condition is identified. A safety function of this kind can involve, for example, bringing the manipulator to a standstill or stopping a feed device, which conveys objects to be processed by the manipulator into the manipulator cell.

According to one embodiment, the brake is also observed by a further monitoring system, which triggers a safety function if another, further fault condition is identified. This further monitoring system enables, in particular, the identification of fault conditions, which cannot be observed by the first monitoring system. Such a monitoring system can involve, in particular, monitoring the temperature of the brake, wherein, for example, a faulty brake is inferred if a specific maximum temperature is exceeded. Additionally, or alternatively, such further monitoring can be the monitoring of a safety controller, which monitors the function of the inventive first monitoring system. The further monitoring system can relate, in particular, to one or more of the measurements which are also monitored by the first monitoring system. In this case, one or more monitoring limits of the further monitoring system can be or can be defined such that the first monitoring system responds first and the further monitoring system only responds if a malfunction of the first monitoring system can be inferred. If the first monitoring system and the further monitoring system are affected, for example, by a change in position when the manipulator axis is at a standstill, the change of position, which is required for the further monitoring system to signal a fault condition, can be defined as greater than the change of position which is defined to allow inference by the first monitoring system of a fault condition of the brake. This ensures that the further monitoring system only intervenes if a malfunction of the first monitoring system can be inferred.

This increases the overall safety of the manipulator and also minimizes intervention during normal operation of the manipulator, since firstly upon response by the (first) monitoring system, actuation of the axis is reactivated by the motion controller and the further monitoring system, in particular a safety monitoring system, which triggers a STOP 0 or a STOP 1, is only activated if said transfer of the fixing of the axis from the faulty brake by the motion controller or the actuator does not function correctly.

According to one embodiment of the inventive method, the brake is opened if a fault condition of the brake is identified. Such opening can take place, in particular if a fault condition is identified by the first monitoring system and/or if a fault condition is identified by a further monitoring system. Opening a faulty brake causes the residual brake torque not to affect the reactivated controller of the actuator as a disturbance variable, which controller is then intended, for example, to fix the axis.

BRIEF DESCRIPTION OF THE DRAWINGS

Further advantages and features are indicated in the subclaims and the example embodiments. The figures show the following partially in schematic form:

DETAILED DESCRIPTION

Figure 1:
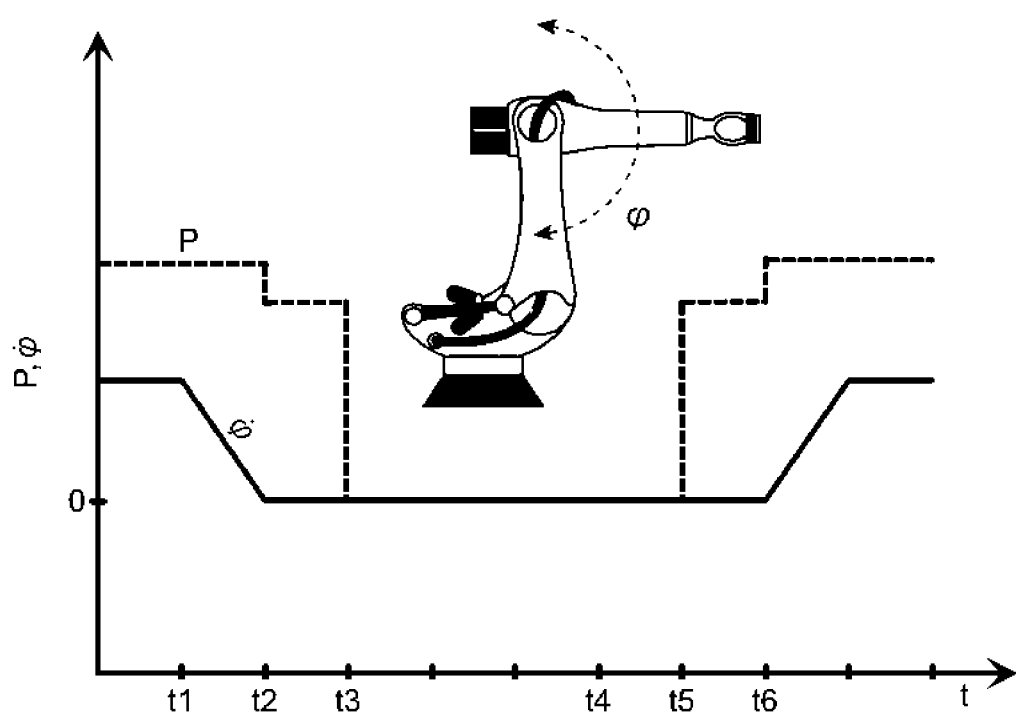
FIG. 1 shows a chronological progression of a speed and a power requirement of a manipulator axis according to one embodiment of the present invention.

FIG. 1 shows a section of a trajectory of the manipulator axis, which is executed by an industrial robot, wherein the speed $\dot{\phi}$ as well as a performance history P, which is dependent on various conditions of the manipulator, is shown over the time period t. The time axis is not necessarily drawn linearly to scale here, but describes the more general scenario of a qualitative chronological arrangement of the times shown.

Up to time t1, the axis 3 of the robot, which is shown by a dotted double arrow of motion in FIG. 1, proceeds under motion control from its controller at a positive, constant speed $\dot{\phi}>0$. At time t1, the motion controller commands a stop and the speed of axis 3 decreases in a linear manner until $\dot{\phi}=0$. From time t2, the axis 3 of the robot is at a standstill. Once the axis has stopped (see FIG. 3: step S10), the axis brake will close (S20). The brake is a safety or normally closed brake, which engages when a power supply is deactivated. As a result of this, the power consumption of the axis 3 reduces shortly after time t2 to the power required to open the brake.

Once the brake has closed, actuation of the actuator is deactivated by the motion controller at time t3 (S30). The motion controller continues to run, wherein, however, it no longer sends instructions or transmits power to the actuator. Consequently, the actuator of axis 3 is without power.

At time t4, when the axis 3 is still at a standstill, the brake monitoring system, which is active the whole time, identifies a fault condition (S40) based on an acceleration monitoring system, which has identified an acceleration of the axis 3. Accordingly, immediately after signaling the fault condition of the brake, actuation of the robot actuator is reactivated by the motion controller (S60). After time t5, the motion controller sends instructions again or transmits power to the actuator. Accordingly, there is an increase in power consumption to power the motor.

At time t6, the faulty brake is also opened (S70). This ensures that braking forces still applied by the brake cannot adversely affect position control of the actuation of the robot axis.

Figure 2:
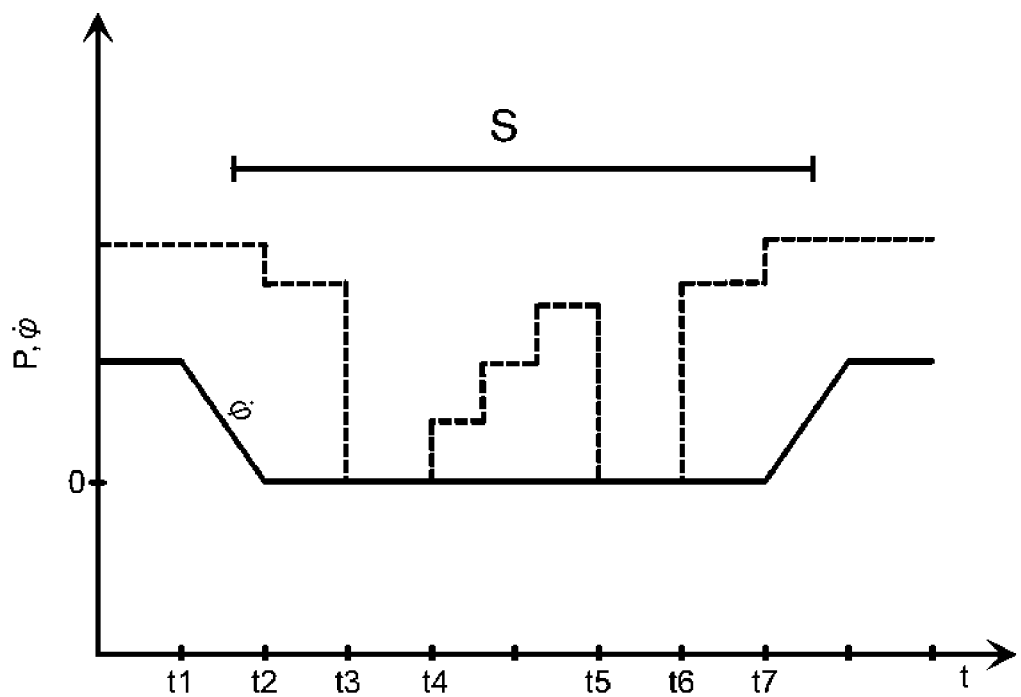
FIG. 2 shows a chronological progression of the speed and power requirement of a manipulator axis according to a further embodiment of the present invention.

FIG. 2 also shows a section of a trajectory of a manipulator axis 3 of an industrial robot, wherein the speed thereof over the period is also shown as well as a performance history of the robot axis, which is dependent on various conditions of the robot and the monitoring system. Here, as in FIG. 1, the time axis is not necessarily drawn linearly to scale, but describes the more general scenario of a qualitative chronological arrangement of the times shown.

In the example in FIG. 2, firstly a command is given to stop the axis 3 (S10) and close the mechanical brakes of axis 3 (S20). Actuation of the actuator of the axis 3 is then deactivated (S30) and monitoring of the mechanical brake activated (S40). It is calculated from the planning of the robot trajectory that the standstill time of the axis 3 is sufficiently long in this case for a brake test to be carried out (S50). Accordingly, after time t4, a force is exerted gradually on the axis by the axis actuator when the mechanical brake is closed. The force increases continuously and gradually until it reaches a predefined maximum torque which indicates safe functioning of the brake. Once the maximum torque has been reached, the brake test is terminated and the force generated by the actuator on the axis is reduced to 0 again. Since, a release is expected at time t6 based on motion planning, actuation of the actuator is reactivated by the motion controller. There is an increase in power accordingly. Moreover, the brake is supplied with power at time t7 and consequently it opens and the axis 3 can proceed according to its planned motion. Since no fault condition of the brake has been identified in this case, no command has been given previously for activation of the actuator by the motion controller.

Figure 3:
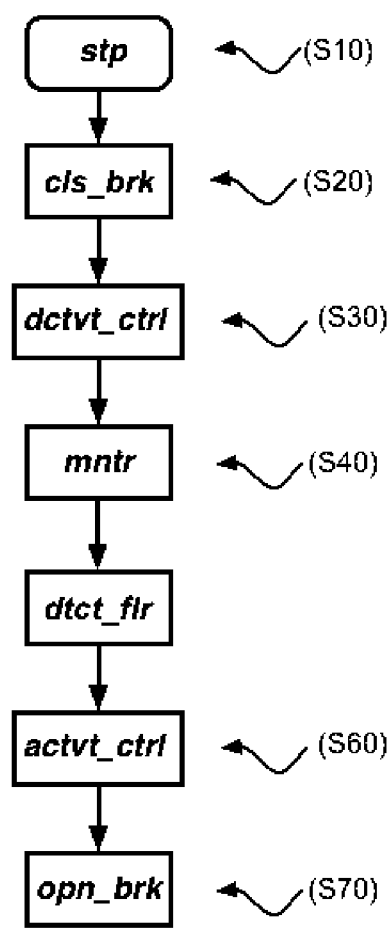
FIG. 3 shows a flow diagram according to one embodiment of the invention.

FIG. 3 shows a flow diagram according to one embodiment of the invention. Here a manipulator axis is first stopped (Step S10). A mechanical brake is then closed (Step S20) and actuation of the manipulator axis actuator is deactivated by the motion controller (Step S30). Monitoring of the brake commences at the same time as the deactivation of the actuator (Step S40). If said monitoring system detects a fault in the brake (Step S50), the actuator of the manipulator axis is reactivated by the motion controller (Step S60), in order to move the manipulator axis into a safe position or to keep it in position. The brake is opened at the same time (Step S70) so that the motion controller is not disrupted by braking forces.

LIST OF REFERENCE NUMERALS t Time
t1-t8 absolute times
$\phi$ Position axis 3
$\dot{\phi}$ Speed of axis 3 of the manipulator
P Performance history of axis 3
S Monitoring active

What is claimed is:

1. A method of fixing at least one axis of a manipulator, in particular of a robot, the method comprising:
    closing a mechanical brake of the at least one axis;
    deactivating an actuator of the axis with a motion controller that controls operation of the robot;
    monitoring the mechanical brake with a monitoring system; and
    activating the actuator with the motion controller in response to the monitoring system identifying a fault condition of the mechanical brake.

2. The method of claim 1, further comprising:
    supplying the actuator with power while the brake is closed.

3. The method of claim 2, wherein supplying the actuator with power comprises continuously supplying the actuator with power.

4. The method of claim 1, wherein monitoring the mechanical brake comprises monitoring a measurement based on a position of the axis and/or a chronological derivation of the position of the axis.

5. The method of claim 1, wherein monitoring the mechanical brake comprises monitoring a measurement based on a current and/or a voltage of the actuator of the axis.

6. The method of claim 1, wherein monitoring the mechanical brake comprises monitoring a measurement based on a force of the actuator of the axis.

7. The method of claim 1, further comprising:
    assessing the brake while the brake is closed.

8. The method of claim 1, further comprising:
    generating a force with the actuator while the brake is closed.

9. The method of claim 8, further comprising:
    increasing the force generated by the actuator continuously or in stages and/or up to a predefined force is attained.

10. The method of claim 9, wherein continuously increasing the force comprises increasing the force in a linear or gradual manner.

11. The method of claim 9, wherein increasing the force up to a predefined force is attained comprises increasing the force until the manipulator executes a breakaway movement and/or until a predefined minimum force is reached.

12. The method of claim 8, further comprising:
    recording and communicating the force to at least one of a controller and/or a device external to the manipulator.

13. The method of claim 1, further comprising:
sending a signal to at least one of a controller of the manipulator and/or a device external to the manipulator when a failure condition of the brake is identified.

14. The method of claim 1, further comprising:
further monitoring the brake; and
triggering a safety function when the further monitoring identifies a further fault condition.

15. The method of claim 1, further comprising:
opening the brake when a fault condition of the brake is identified.

16. A controller for a manipulator, in particular for a robot, for controlling a process movement, the controlling comprising a storage medium including a program code that, when executed by the controller, causes the controller to:
close a mechanical brake of at least one axis of the robot;
deactivate an actuator of the at least one axis;
monitor the mechanical brake with a monitoring system; and
activate the actuator in response to the monitoring system identifying a fault condition of the mechanical brake.

17. A computer program product having program code stored on a non-transitory machine readable data medium, the programming code configured to, when executed by a computer, cause the computer to:
close a mechanical brake of at least one axis of a robot;
deactivate an actuator of the at least one axis;
monitor the mechanical brake with a monitoring system; and
activate the actuator in response to the monitoring system identifying a fault condition of the mechanical brake.

* * * * *